(12) United States Patent
Hasse

(10) Patent No.: US 6,286,988 B1
(45) Date of Patent: *Sep. 11, 2001

(54) EXTRUSION HEAD HAVING TOOTHED WHEELS WITH MIXING DEVICE AND ADJUSTABLE SHEAR EFFECT

(76) Inventor: Hartmut Hasse, Ostpreussenstrasse 8, D-25486 Alveslohe (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/171,360
(22) PCT Filed: Apr. 2, 1997
(86) PCT No.: PCT/EP97/01653
§ 371 Date: Oct. 16, 1998
§ 102(e) Date: Oct. 16, 1998
(87) PCT Pub. No.: WO97/38837
PCT Pub. Date: Oct. 23, 1997

(30) Foreign Application Priority Data

Apr. 16, 1996 (DE) .............................. 196 14 894

(51) Int. Cl.$^7$ ...................................... B01F 5/14
(52) U.S. Cl. .............................. 366/77; 366/272
(58) Field of Search .................. 366/69, 77, 79, 366/83, 86, 190, 191, 272; 425/145, 204, 205, 208, 209; 418/191, 192, 189, 205, 201.1, 201.2, 201.3, 206.5

(56) References Cited

U.S. PATENT DOCUMENTS

| | | | |
|---|---|---|---|
| 1,595,470 | * | 8/1926 | Johnson . |
| 2,481,646 | * | 9/1949 | Conklin . |
| 2,487,732 | * | 11/1949 | Schanzlin . |
| 2,515,201 | * | 7/1950 | Dulmage et al. . |
| 2,692,405 | * | 10/1954 | Gayler . |
| 2,767,437 | * | 10/1956 | Marshall . |

(List continued on next page.)

FOREIGN PATENT DOCUMENTS

| | | | | |
|---|---|---|---|---|
| 93020 | * | 10/1972 | (DE) | ............. 366/77 |
| 3133647 | * | 3/1983 | (DE) | ............. 366/77 |
| 3833777 | * | 10/1990 | (DE) | ............. 366/77 |
| 0 165 218 A3 | | 5/1985 | (EP) . | |
| 58-24405 | * | 2/1983 | (JP) | ............. 366/77 |
| 58-183210 | * | 10/1983 | (JP) | ............. 366/77 |

OTHER PUBLICATIONS

Plastics Engineering, Specifying a Total Gear Pump System, Feb. 1994, pp. 19–23.

*Primary Examiner*—Charles E. Cooley
(74) *Attorney, Agent, or Firm*—D. Peter Hochberg; Katherine R. Vieyra; William H. Holt

(57) ABSTRACT

An extrusion head with a mixing device and an adjustable shear effect, for homogenizing, mixing and shearing the material conveyed to it in form of polyester melts, elastomers and other miscible viscous and paste materials. The extrusion head has a pair of toothed wheels arranged one over the other, with one wheel having a double helical gearing and the other having a pair of axially spaced oblique teeth with a center annular groove. The material supplied flows around one toothed wheel and fills its tooth gaps and those of the other toothed wheel. The material is taken back in the outer region of the one toothed wheel by the rotary movement, is axially crushed out by the other toothed wheel and conveyed into an outlet channel through the groove in the other toothed wheel. The mixing, homogenization and shearing of the material can be adjusted by the drive of the one toothed wheel, thus making it possible to obtain a high outlet temperature where the material is elastomers. The extrusion head including the toothed wheels may be fitted with a temperature equalizer if required.

10 Claims, 4 Drawing Sheets

U.S. PATENT DOCUMENTS

| | | | |
|---|---|---|---|
| 2,871,794 | * | 2/1959 | Mosbacher . |
| 2,880,455 | * | 4/1959 | Mineah . |
| 3,174,408 | * | 3/1965 | Miller . |
| 3,177,127 | * | 4/1965 | Longstreth . |
| 3,831,906 | * | 8/1974 | Wakeman . |
| 4,097,206 | * | 6/1978 | Schonherr ............................ 418/189 |
| 4,336,213 | * | 6/1982 | Fox ..................................... 418/191 |
| 4,642,040 | * | 2/1987 | Fox ..................................... 425/204 |
| 4,707,139 | * | 11/1987 | Valenzky et al. ....................... 366/77 |
| 4,721,589 | * | 1/1988 | Harris .................................. 425/145 |
| 5,048,405 | * | 9/1991 | Takahashi et al. ..................... 366/77 |
| 5,076,770 | * | 12/1991 | Dabling et al. ....................... 418/189 |
| 5,108,275 | * | 4/1992 | Sager ................................ 418/201.3 |
| 5,153,009 | * | 10/1992 | Voigt .................................... 425/209 |
| 5,190,450 | * | 3/1993 | Ghosh et al. ........................ 418/189 |
| 5,267,847 | * | 12/1993 | Bohm et al. ........................... 366/77 |
| 5,304,053 | * | 4/1994 | Gohlisch et al. ..................... 425/204 |
| 5,310,256 | * | 5/1994 | Boden ................................... 366/191 |
| 5,378,415 | * | 1/1995 | Gohlisch ............................... 425/205 |
| 5,829,872 | * | 11/1998 | Mizuguchi et al. ..................... 366/77 |

* cited by examiner

EXTRUSION HEAD HAVING TOOTHED WHEELS WITH MIXING DEVICE AND ADJUSTABLE SHEAR EFFECT

BACKGROUND OF THE INVENTION

1. Field of the Invention

The invention relates to an extrusion head being suitable for homogenizing, mixing and heating/cooling of the material supplied from the extruder before it.

2. Description of the Prior Art

The toothed wheel of the present invention is driven for the adjustable shear effect and thus it can increase the mixing effect and the outlet temperature combined with a high shear speed and so it releases the vulcanization process. An extrusion head with shear effect to reach a predetermined temperature for elastomers is known and already in operation. A mixing effect cannot be achieved by this known extrusion head. The shear head technology is cost-intensive in that it is expensive to buy and has a relatively high energy consumption. Furthermore, some manufacturers in the plastics and rubber industry use such combinations of extruders with preflanged gear pumps in order to achieve a continuous final product with less pulsation. This process also does not provide a mixing process. Furthermore, German Patent publication DE3024552A1 shows a tangent system working with different circumferential speed and wiping blades in an open trough to discharge the material. German Patent Publication DE4114265A2 shows a toothed wheel system in a trough to melt plastic granulates or flakes being pressed out by the toothed wheel system to enable a filtering process.

German Patent Publication DE3426436A1 shows a combination of tangent systems working into each other.

The actual two-step pump design achieves a better heating of the material to be processed by the double crushing of material from the tooth gaps. This results in further savings at the following heating times.

The earlier described systems cannot produce a defined mixing process as well as not providing controllable friction heat.

SUMMARY OF THE INVENTION

The invention is based on the problem that an extruder with mixing effect has to be designed in that the material flows out of the extrusion nozzle in an homogenized and mixed way at a predetermined temperature.

According to a preferred embodiment of the invention, an extrusion head is provided for homogenizing, mixing and heating or cooling material supplied by an extruder. The material supplied flows around an upper divided toothed wheel and fills all gaps of the toothed wheels in the assembly. The material flow is regulated by a dam. The material supplied in the outer areas of a lower toothed wheel is returned again and is crushed through the upper divided toothed wheel into the outer area in axial direction to the center where it is mixed with the extruded material; then it flows to the outlet of the extrusion head again. The shear and mixing effect can be predetermined by the toothed wheel geometry.

An object of the invention is to provide an extrusion head with a mixing device for providing an adjustable mixing effect adapted for different materials and careful homogenization because of shearing.

Another object is to provide an extrusion head with a mixing device which generates no thermal load by friction during the extrusion process.

Yet another object is the provision of an extrusion head with a mixing device and a continuous material outlet due to the optimum homogenization.

It is also an object to provide an extrusion head with a mixing device for yielding extrusion products made of difficult materials with dimensional accuracy greater than that of the prior art.

Yet a further object of the invention is to provide an extrusion head with a mixing device for producing prevulcanized elastomers.

Another object is the provision of an improved extrusion system with a reduced extruder length.

It is still a further object to produce an improved extrusion system having decreased energy and investment costs.

Other objects will be apparent from the description herein and the appended claims.

For a further clarification of its basic principle, two of the design types of the invention are shown in the drawings and are described hereinafter:

DETAILED DESCRIPTION OF THE PREFERRED EMBODIMENTS

Figure 1:
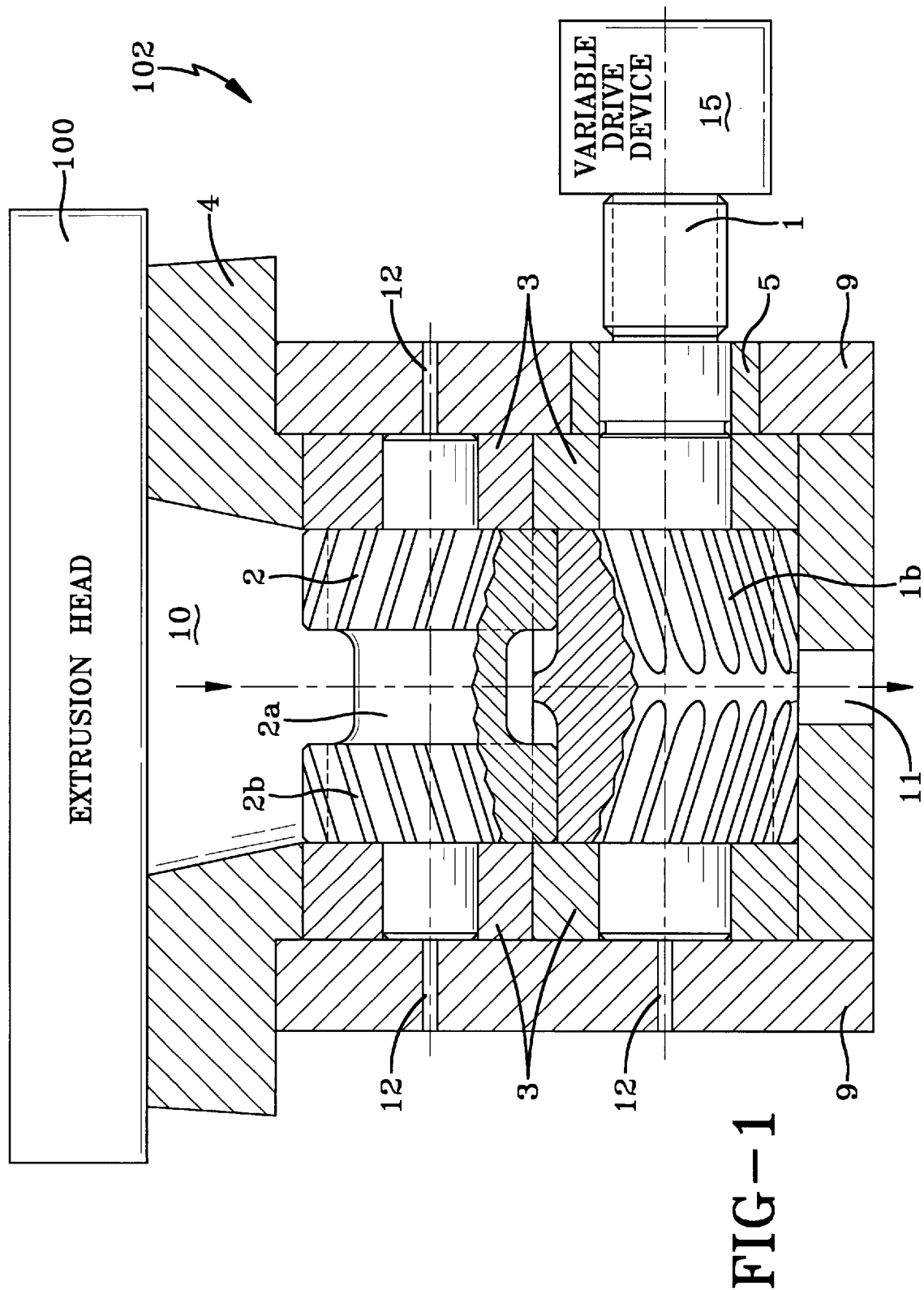
FIG. 1 in the drawing shows a longitudinal section through an extrusion head with inside toothed wheels 1 and 2.

FIG. 1 depicts an extrusion head 100 operatively connected to a conveying system such as an extruder for feeding a mixing head, illustrated schematically and identified by the numeral 102. Extrusion head 100 includes a pair of toothed wheels or spline shafts 1 and 2 arranged one over the other and carried in a housing 4. Material to be mixed enters extrusion head 100 through inlet cone 10. Wheel 1 is driven by a variable drive device 15. The driven toothed wheel 1 has a double helical gearing 1b. Wheel 1 extends through a labyrinth seal 5. The driven toothed wheel 2 is toothed twice in an oblique way as shown at 2b and has a center or ring groove 2a. The shaft journals of the two toothed gears are carried in bearing bushings 3. A set of leakage flow bore holes 12 in the lateral housing cover 9 are directed towards outside. Material from extrusion head 100 moves via cone 10 into toothed wheel 2, where it is crushed by the meshing toothed wheels 1 and 2, and is urged into ring grove 2a (where it is mixed with newly arriving material and urged to the center of wheel 1 by the inclined configuration of the teeth) and exits through outlet channel 11. The material moving through the extrusion head lubricates the bearings.

Figure 2:
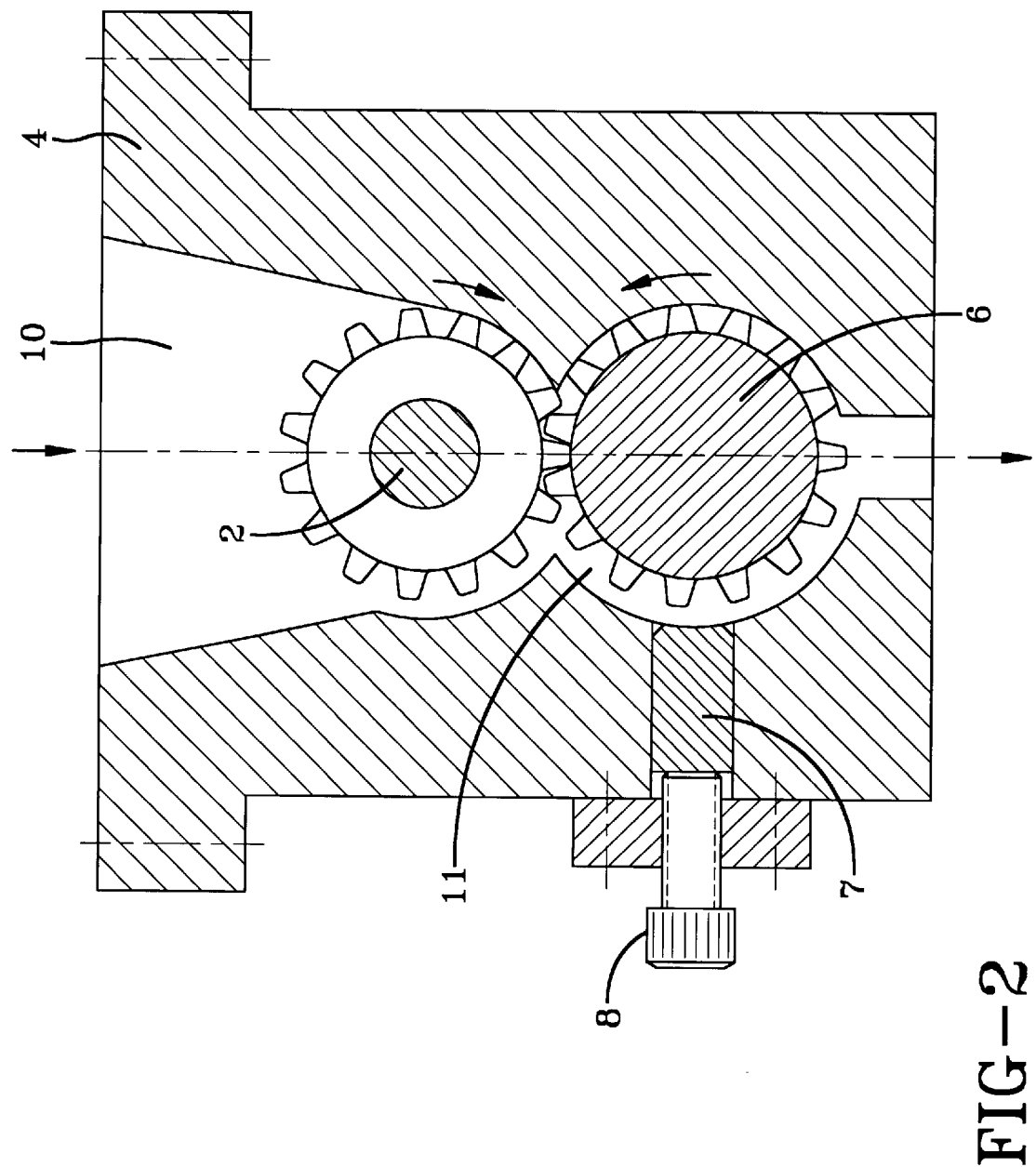
FIG. 2 shows a cross section through an extrusion head radial to the toothed wheels 2,6 and 1.

FIG. 2 shows a radial section through the center of the toothed wheels or spline shafts 2, 6 and 1. A dam 7 with an adjusting screw 8 regulates the material supplied to an outlet channel 11. The center groove 2a is preferably of the same width as the width of outlet channel 11. Seal 5 functions to discharge crushed material from the extruder head or returns material to the material flow.

Figure 3:
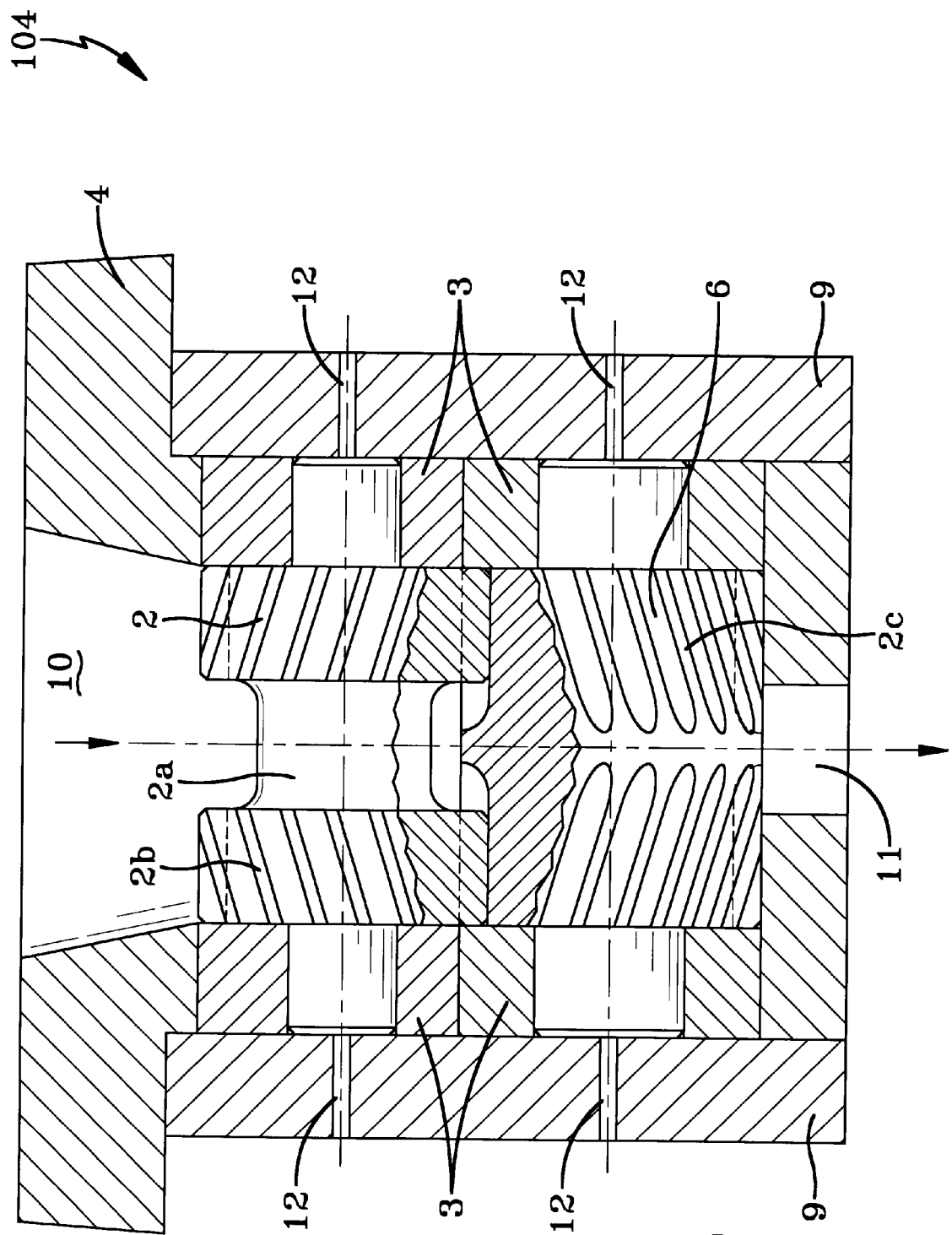
FIG. 3 shows a longitudinal section through an extrusion head with inside toothed wheels 2 and 6.

FIG. 3 shows two toothed wheels 2 and 6 arranged one over the other and carried in the housing. These toothed wheels are rotated automatically by the material supplied. A lateral housing 9 is disposed on both sides extrusion head 104, and leakage flow bore holes 12 extend therethrough.

Figure 4:
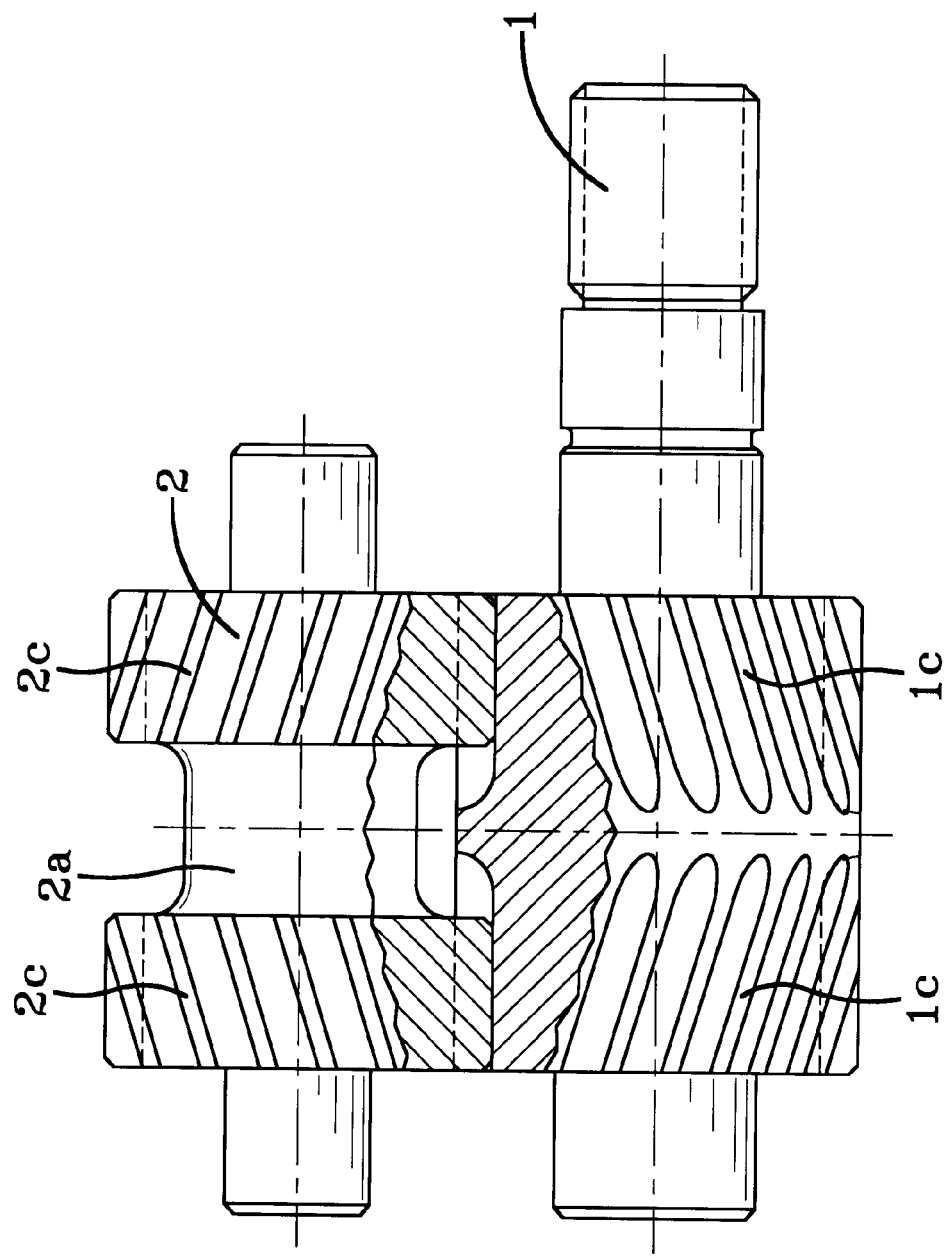
FIG. 4 shows a section of two toothed shafts.

FIG. 4 shows the toothed wheel shafts 1 and 2. Toothed wheel 2 is toothed twice in an oblique way as shown at 2c and toothed wheel 1 has a double helical gearing as shown at 1c running out towards the center.

In the extrusion head 104 shown in FIG. 3, the material returning through the toothed wheel 6 and material from the toothed wheel 2 is crushed in the axial direction towards the center and mixed through the groove 2a in toothed wheel 2 in the outlet channel 11.

By crushing the material axially out of the tooth gaps of toothed wheel 1 and toothed wheel 2, a high flow speed is generated which produces friction heat when high-viscous materials like elastomers are processed. The material is therefor pressed out of the extruder with an increased temperature.

The driven system in FIG. 1 is able to vary the mixing effect because of the variable speed of toothed wheel 1. Accordingly, the speed can be adapted to the material to be processed. In case of high-viscous materials, such as elastomers, the axial flow speed can produce friction heat by crushing or squeezing out the material from the tooth gaps of toothed gears 1 and 2 (FIG. 1) so that the material is prevulcanized and a solid product leaves the outlet channel 11. Due to this pre-vulcanization, downstreamed vulcanization units can be configured in a more cost-effective manner. Either extrusion head 102 or 104 can be filled with a temperature equalizer if required.

The invention has been described in detail with particular emphasis on the preferred embodiments thereof, but variations and modifications within the spirit and scope of the invention may occur to those skilled in the art to which the invention pertains.

What is claimed is:

1. An extrusion head for attachment to a conveying device, the conveying device including an extruder, or other extrusion device, the extrusion head being a mixing device and providing an adjustable shear effect, said extrusion head plasticizing, homogenizing, mixing and shearing of material conveyed to it, the material being in the form of polyester melts, elastomers and their miscible and past materials, said extrusion head comprising: first and second toothed wheels arranged one over the other, said first of said toothed wheels having teeth separated from each other by tooth gaps on the exterior surface thereof and said second of said toothed wheels having axially spaced teeth separated from each other by tooth gaps with an annular groove between said spaced teeth, said teeth having an inclined geometry configured to urge the material being fed between the tooth gaps toward the axial center of the toothed wheels for shearing the material and for mixing with new material being fed by the conveying device, and to move the crushed material toward the center of said toothed wheels into the newly arriving material and into said annular groove; a housing for said toothed wheels having an outlet channel; and means for controlling the speed of said toothed wheels for discharging some of the processed material and for supplying a portion of the material back into a material flow from the conveying device according to the speed of one of said toothed wheels.

2. An extrusion head according to claim 1 and further including adjusting means for adjusting the flow of material through said outlet channel.

3. The extrusion head according to claim 2 wherein said adjusting means is an adjusting screw for forming a material dam to regulate the flow of material in said outlet channel.

4. The extrusion head according to claim 1 wherein said annular groove and said outlet channel have the same general width.

5. The extrusion head according to claim 1 wherein said second toothed wheel is located over said first toothed wheel, and further including driving means for rotating said first toothed wheel for influencing the exit temperature of the material by friction and to prevulcanize the material in said outlet channel.

6. The extrusion head according to claim 5 wherein said driving means is a variable drive for rotating said first toothed wheel.

7. The extrusion head according to claim 1 wherein said teeth of said first toothed wheel are divided double helical gearing.

8. The extrusion head according to claim 1 wherein said teeth of said second toothed wheel comprise double oblique gearing on opposite sides of said annular groove.

9. The extrusion head according to claim 1 and further comprising bearings for said first and second toothed wheels, the material moving through said extrusion head lubricating said bearings.

10. The extrusion head according to claim 1 and further including a cover plate for said first and second toothed wheels, said cover plate including at least one leakage flow bore hole for discharging material from said extrusion head or returning material into the material flowing through said extrusion head.

* * * * *